United States Patent
Patil et al.

(10) Patent No.: US 8,516,078 B2
(45) Date of Patent: Aug. 20, 2013

(54) SYSTEM AND METHOD FOR FILE TRANSFER IN UNIVERSAL PLUG AND PLAY TELEPHONY SERVICE

(75) Inventors: Mayuresh Madhukar Patil, Byrasandra (IN); Je-Young Maeng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 220 days.

(21) Appl. No.: 13/020,474

(22) Filed: Feb. 3, 2011

(65) Prior Publication Data

US 2011/0191443 A1    Aug. 4, 2011

(30) Foreign Application Priority Data

Feb. 3, 2010  (IN) .............................. 250/CHE/2010

(51) Int. Cl.
*G06F 15/16*    (2006.01)
(52) U.S. Cl.
USPC ...... 709/218; 379/219; 379/201.01; 370/236; 370/259
(58) Field of Classification Search
USPC ................. 709/204, 205; 370/236, 410, 259; 379/219, 201.01
See application file for complete search history.

(56) References Cited

U.S. PATENT DOCUMENTS

| 7,724,753 B2* | 5/2010 | Naqvi et al. ................. 370/410 |
| 2005/0058073 A1* | 3/2005 | Ayyagari et al. ............. 370/236 |
| 2006/0053447 A1 | 3/2006 | Krzyzanowski et al. |
| 2007/0203979 A1* | 8/2007 | Walker et al. ................ 709/204 |
| 2009/0067441 A1 | 3/2009 | Ansari et al. |
| 2010/0241711 A1* | 9/2010 | Ansari et al. ................. 709/205 |

FOREIGN PATENT DOCUMENTS

WO    WO 2008/085202    7/2008

* cited by examiner

*Primary Examiner* — Dustin Nguyen
(74) *Attorney, Agent, or Firm* — The Farrell Law Firm, P.C.

(57) ABSTRACT

A method and system for transferring a file from a home network to Wide Area Network (WAN) user device using the Universal Plug and Play (UPnP) telephony service are provided. A request is received from a Telephony Control Point (TCP) to start a file transfer session. The request can include information associated with the file. The file transfer session is established using a messaging service based on the request and file information received in the request from the TCP. The file is fetched from the TCP and stored in the TS. An invite is sent to the WAN user device for initiating the file transfer session from the home network to the WAN user device. The file is transferred to the WAN user device when an acknowledgment of the invite is received from the WAN user device.

12 Claims, 8 Drawing Sheets

SYSTEM AND METHOD FOR FILE TRANSFER IN UNIVERSAL PLUG AND PLAY TELEPHONY SERVICE

PRIORITY

This application claims priority under 35 U.S.C. §119(a) to an application filed in the Indian Patent Office on Feb. 3, 2010 and assigned Serial No. 250/CHE/2010, and an application filed in the Indian Patent Office on Oct. 6, 2010 and assigned Serial No. 250/CHE/2010, the contents of which are incorporated herein by reference.

BACKGROUND OF THE INVENTION

1. Field of the Invention

The present invention relates generally to the field of home networking, and more particularly to Universal Plug and Play (UPnP) enabled telephony devices.

2. Description of Related Art

UPnP telephony service allows access to telephony services using home devices. This provides a user with flexibility to access telephony services at home using different kinds of devices. The UPnP is a set of computer network protocols promulgated by the UPnP forum. The goals of UPnP telephony are to allow home devices to connect seamlessly and to simplify implementation of networks in the home (for example, data sharing, communications, and entertainment) and corporate environments. The UPnP achieves these goals by defining and publishing UPnP device control protocols built upon open, Internet-based communication standards.

The UPnP architecture allows peer-to-peer networking of Personal Computers (PCs), networked appliances, and wireless devices. The UPnP architecture is a distributed, open architecture based on established standards such as Transmission Control Protocol or Internet Protocol (TCP/IP), User Datagram Protocol (UDP), Hypertext Transfer Protocol (HTTP) and Extensible Markup Language (XML).

The UPnP architecture supports zero-configuration networking. An UPnP compatible device from any vendor can dynamically join a network, obtain an IP address, announce its name, convey its capabilities upon request, and learn about the presence and capabilities of other devices. Dynamic Host Configuration Protocol (DHCP) and Domain Name System (DNS) servers are optional and are only used if they are available on the network. The UPnP compatible device can leave the network automatically without leaving any unwanted state information.

The UPnP telephony services also provides discovery, control and event mechanisms. The discovery mechanism is enabled using Simple Service Discovery Protocol (SSDP). All control messages are in the form of XML and follow General Event Notification Architecture (GENA) protocol. Thus, the UPnP makes the availability and unavailability of the devices known to the other devices in the network on the fly.

The UPnP defines new telephony services for extending the user experience in the home to access of the telephony services, such as, messaging services, presence services, and call handling (packet switching or circuit switching).

The UPnP telephony defines the messaging service and the call management service, which allows the user to access the messaging service by, for example, sending the message using the device which does not have the messaging capability and initiating the media calls. The UPnP telephony messaging service uses the basic UPnP architecture to define the messaging service so it defines the actions and state variable to access the messaging service.

As analogous to UPnP Device Architecture (DA), the UPnP telephony services define the following three kinds of devices.

A Telephony Server (TS) provides messaging, and presence related services to the user. The TS also provides call management services.

A Telephony Control Point (TCP), which is the same as Control Point (CP), initiates the actions provided by the TS.

A Telephony Client (TC) device is for media related handling and for acting as the input and output of the device Current messaging services allow the user to send messages, for example, messages using Short Message Service (SMS), Multimedia Message Service (MMS), Chat Instant Messaging (Chat IM) and Electronic mail (Email). The messaging services also allow the user to group the messages into one session by defining the actions to create the IM session and allowing the user to modify the existing session.

Table 1 shows a state variables list and the message service.

TABLE 1

| Variable Name | Type | Values |
| --- | --- | --- |
| NewMessage | String | Message Ids |
| IMSessionStatus | String | Session information (Session closed, Session updated, Session rejected, User typing) |
| A_ARG_TYPE_MessageID | String | Any string (Unique string) |
| A_ARG_TYPE_MessageClass | String | Email/SMS/MMS/Instant Message |
| A_ARG_TYPE_MessageFolder | String | Received/Deleted/ALL/Sent/Outgoing |
| A_ARG_TYPE_RetrieveFlag | String | Message flag: Notified/Read/Unread/All |
| A_ARG_TYPE_Message | String (XML Fragment) | Message Structure |
| A_ARG_TYPE_MessageList | String (XML Fragment) | Message Information (message ID or Date Recipient or subject etc) |

Table 2 below shows an action list and the message service.

TABLE 2

| Action Name | Description |
| --- | --- |
| ReadMessage( ) | Reading the message stored in the TS (Input is MessageID) |
| ReadLastMessage( ) | Reading last Message in storage, (input argument: Message class, Message Folder, Retrieve Flag) |
| GetNewMessage( ) | Requesting New Message IDs |
| GetMessage( ) | Getting Messages Information (input para: MessageClass, Message Folder, Retrieve Flag) |
| GetFilteredMessage( ) | Getting Filtered message with specified message filter |
| SendMessage( ) | Sending the message to TS |
| DeleteMessage( ) | Deleting Message |

TABLE 2-continued

| Action Name | Description |
| --- | --- |
| CreateIMSession( ) | Initiating the IM Session, Input Parameters: IM Session class, Recipients. |
| ModifyIMSession( ) | Adding User, Removing users. (Media Content) |
| AcceptIMSession( ) | Accepting incoming IM Session |
| GetIMSessonStatus( ) | IMsessionStatus variable |
| GetIMSessions( ) | Getting all ongoing messaging on TS |
| GetIMSessionInfo( ) | Retrieving session info input parameter (session ID) |
| CloseIMSession( ) | To close, leave, reject the IM Session |

However, currently there is no mechanism in UPnP technology that allows the user to send a file to any Wide Area Network (WAN) user from the home network.

SUMMARY OF THE INVENTION

The present invention has been made to address at least the above problems and/or disadvantages and to provide at least the advantages described below. Accordingly, an aspect of the present invention provides a system and method for transferring a file from a home network to a WAN user device using the UPnP telephony service.

According to an aspect of the present invention, a method is provided for transferring a file from a home network to a WAN user device using the UPnP telephony service. The method is performed at a TS. A request is received from a TCP to start a file transfer session. The request includes file information, and the TCP and TS are in the home network. The file transfer session is established using a messaging service based on the request and file information received in the request from the TCP. The file is fetched from the TCP and stored in the TS. An invite is sent to the WAN user device for initiating the file transfer session from the home network to the WAN user device. The file is transferred to the WAN user device when an acknowledgment of the invite is received from the WAN user device.

According to another aspect of the present invention, a TS is provided. The TS includes a transceiver and processor. The transceiver receives a request from a TCP to start a file transfer session. The transceiver then fetches a file from the TCP when the request to start the file transfer session is received. The transceiver is also capable of sending an invite to the WAN user device for initiating file transfer from the home network to the WAN user device. Further, the transceiver transfers the file to the WAN user device when an acknowledgment of the invite is received from the WAN user device. The processor establishes the file transfer session using a messaging service based on the request and file information received in the request from the TCP.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
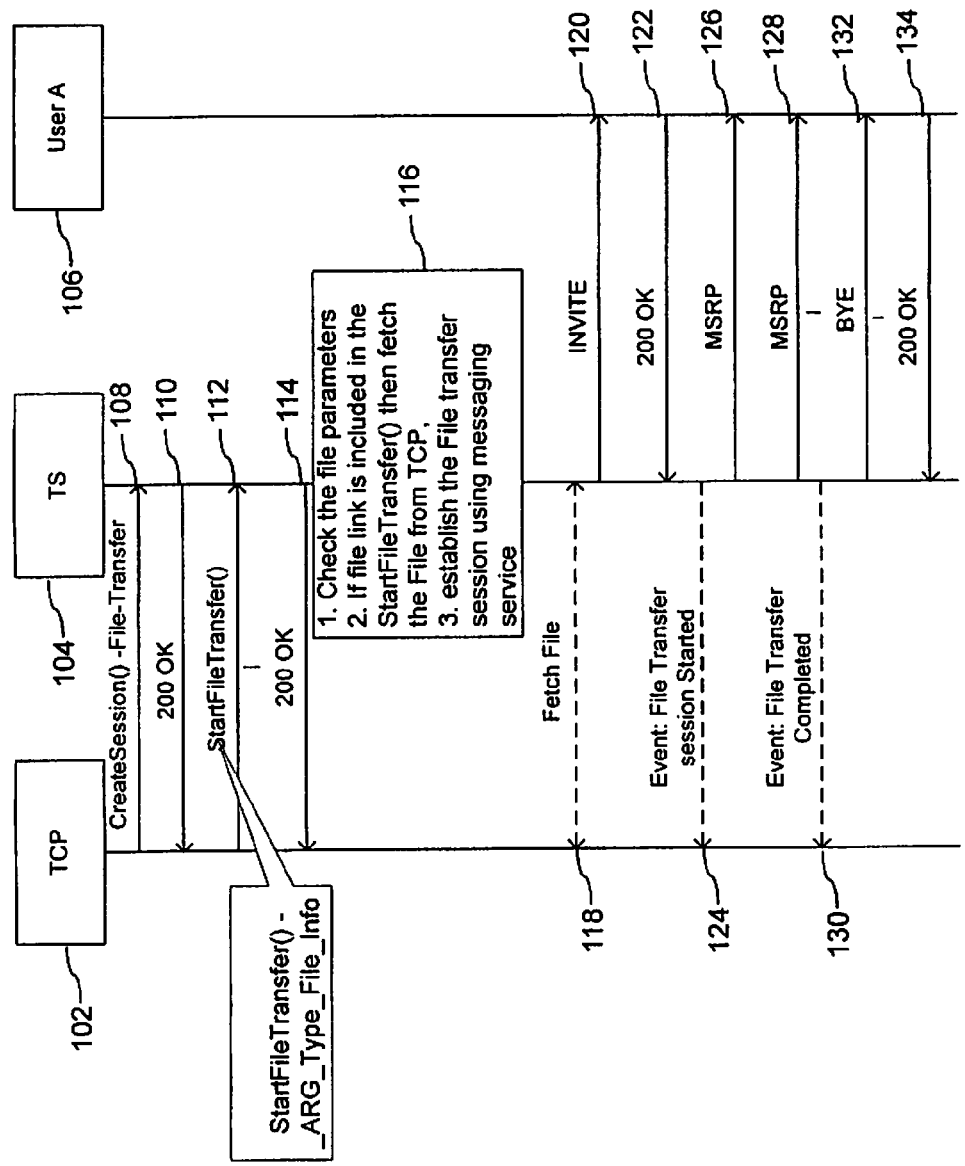
FIG. 1 is a flow diagram illustrating a method for transferring a file from a home network to a WAN user device, in accordance with an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention are provided for illustration purposes only and not for the purpose of limiting the invention.

It is to be understood that the singular forms "a," "an," and "the" include plural referents unless the context clearly dictates otherwise. Thus, for example, reference to "a component surface" includes a reference to one or more of such surfaces.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

FIGS. 1 through 7, discussed below, and the various embodiments used to describe the principles of the present invention are by way of illustration only and should not be construed in any way that would limit the scope of the invention. Those skilled in the art will understand that the principles of the present invention may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flow diagram illustrating a method for transferring a file from a home network to a WAN user device, in accordance with an embodiment of the present invention.

The flow diagram provides a method for transferring a file from a home network to WAN users using the UPnP telephony service. At step 108, a TCP 102 initiates a session with a TS 104 by invoking the CreateSession( ) action. This step defines a new session class to identify the session request as file transfer request. The newly defined session class is "File-Transfer". The TS 104 receives the session request and identifies this as a File-Transfer session by checking the class of the session in a CreateSession( ) action. At step 110, the TS 104 generates a unique session identity and sends the identity to the TCP 102 using a 200 OK response.

In an embodiment of the present invention, a new action is defined between the TCP 102 and the TS 104 so that the TCP 102 can request for the file transfer mechanism. The new action could be initiated using a StartFileTransfer( ) function. At step 112, a start file transfer function is initiated. The function can have one argument called A_ARG_TYPE_FileInfoList, which will include details of the files. In an embodiment of the present invention, the argument has an XML structure. The information may have a file link, file information (type of file), file size, and the like. The detail structure is defined in greater detail below. At step 114, the TS 104 fetches the action and responds with a 200 OK response to TCP 102. At step 116, the TCP 102 also checks for the file information and other file related details. At step 118, the TS 104 fetches the file from TCP 102 using the link provided in the action.

The TS 104 uses the available messaging technology to transfer the file to a WAN user device 106 (User A), once the file is retrieved by the TS 104. The TS 104 can then use the same ongoing session if it is requested by the user. The argument can have a session ID. At step 120, the TS 104 sends a SIP INVITE request to the WAN user device 106 with the SDP that includes the file details, which enables the WAN user device 106 to identify the file transfer session. At step 122, a 200 OK response is received at the TS 104 from the WAN user device 106 and the session is established. At step 124, the TS 104 sends a message to the TCP 102 that the file transfer is started once the session is established.

In an embodiment of the present invention, the TCP 102 can request for continuous progress of the file transfer. Hence, the TS 104 sends a periodic notification about the progress of the file transfer. Thus, a notification type in the argument file info mentions periodic one element and then the TS 104 will send the notification to the TCP 102 periodically. The notification is sent as a state variable update to the TCP 102. This information can be included in the state variable already present in the messaging specification of the UPnP, which are referred to as SessionUpdates. As an alternative, the new state variable for file transfer session is proposed as FileTransferSessioninfo. From step 126 to step 128, the file is transferred using Message Session Relay Protocol (MSRP).

At step 130, the TS 104 sends an event stating that file transfer is complete to the TCP 102. Thereafter, at step 132, the TS 104 terminates the WAN file transfer session by sending the SIP BYE request. At step 134, a 200 OK response is received from the WAN user device 106. Hence, a file can be transferred from LAN networking to WAN network using the above-described method.

For the purpose of explanation, schema for the function StartFileTransfer( ) and argument ARG_TYPE_FileInfoList are shown below.

```
<?xml version="1.0" encoding="UTF-8"?>
  <File_Info    xmlns="urn:schemas-upnp-org:phone:messaging"
xmlns:xsi="http://www.w3.org/2001/XMLSchema-instance"
xsi:schemaLocation="urn:schemas-upnp-org:phone:messaging
    http://www.upnp.org/schemas/phone/messaging-v1.xsd">
```

-continued

```
<FileInfo>
      <file_link>tcp.com/song.mp3</file_link>
      <file_type>Audio-Mp3</file_type>
      <file_size>3454</file_size>
      <Progress_notif time=230>periodic</Progress_notif>
      <sessionID>12KA4</sessionID>
  </FileInfo>
</File_info>
```

Figure 2:
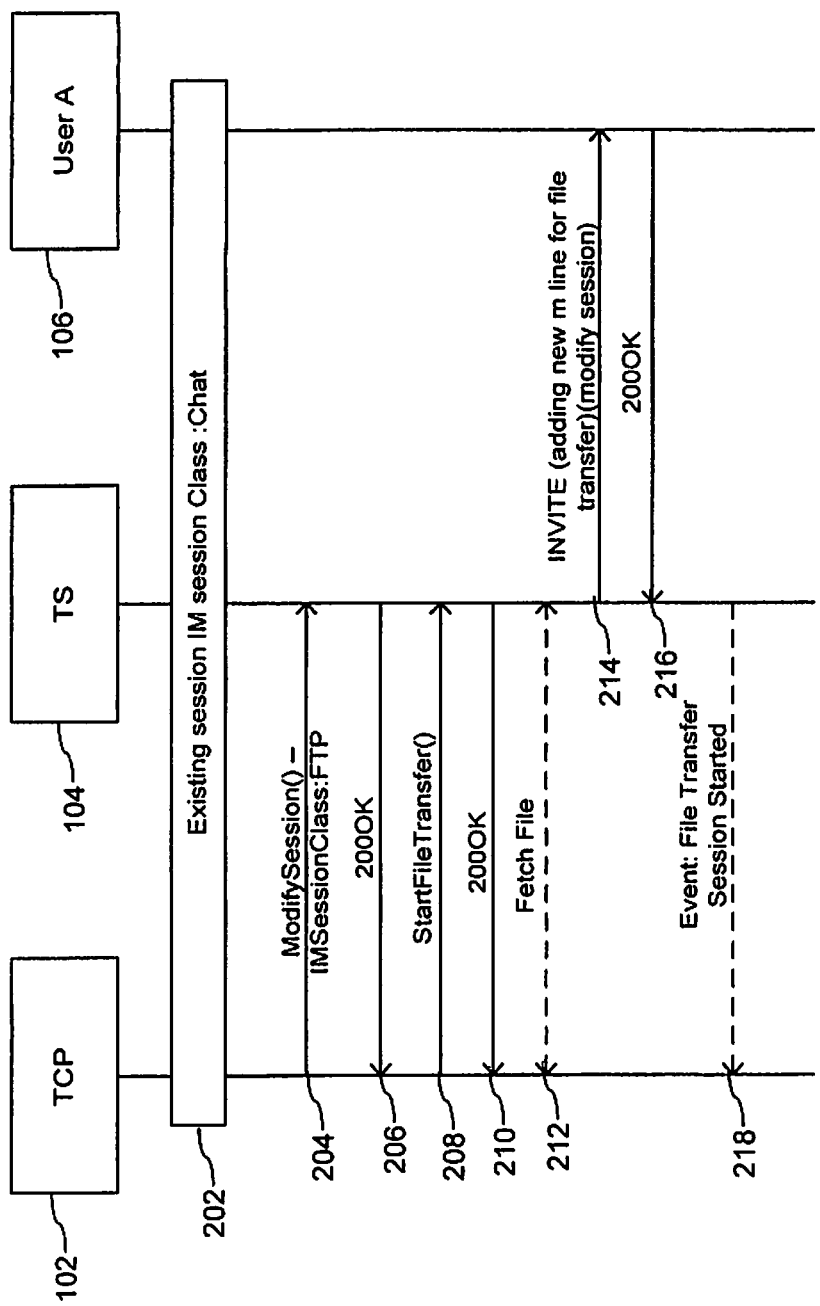
FIG. 2 is a flow diagram illustrating a method for modifying an existing session associated with transferring of file, in accordance with an embodiment of the present invention.

FIG. 2 is a flow diagram illustrating a method for modifying an existing session associated with transferring of file, in accordance with an embodiment of the present invention.

A basic flow for modifying the existing session for transferring the file is shown. At step 202, it is initially assumed that a chat session exist between a WAN user with a Session Class of "Chatting". At step 204, the TCP 102 will modify the session using a ModifySession( ) event with a Session Class of "File-Transfer". At step 206, a 200 OK response is received from the TS 104. At step 208, the TCP 102 starts the file transfer using action StartFileTransfer( ), which also includes the file information. After receiving the file information, the TS 104 sends a 200 OK response to the TCP 102 at step 210. At step 212, the TS 104 fetches the file using the file information received in the action StartFileTransfer( ). At step 214, the TS 104 then modifies the existing IM session which also includes the additional 'm' number of lines for file transfer, and sends the INVITE request to the WAN user device (User A 106). At step 216, the WAN user device 106 sends a 200 OK response to the TS 104. In this way, the TS 104 modifies the session. Once the session is successfully modified, at step 218 the TS 104 will notify the TCP 102 about the successful modification. In an embodiment of the present invention, if the user rejects the session modification, then the TS 104 will send an event to the TCP 102 with an event File transfer session rejected.

Figure 3:
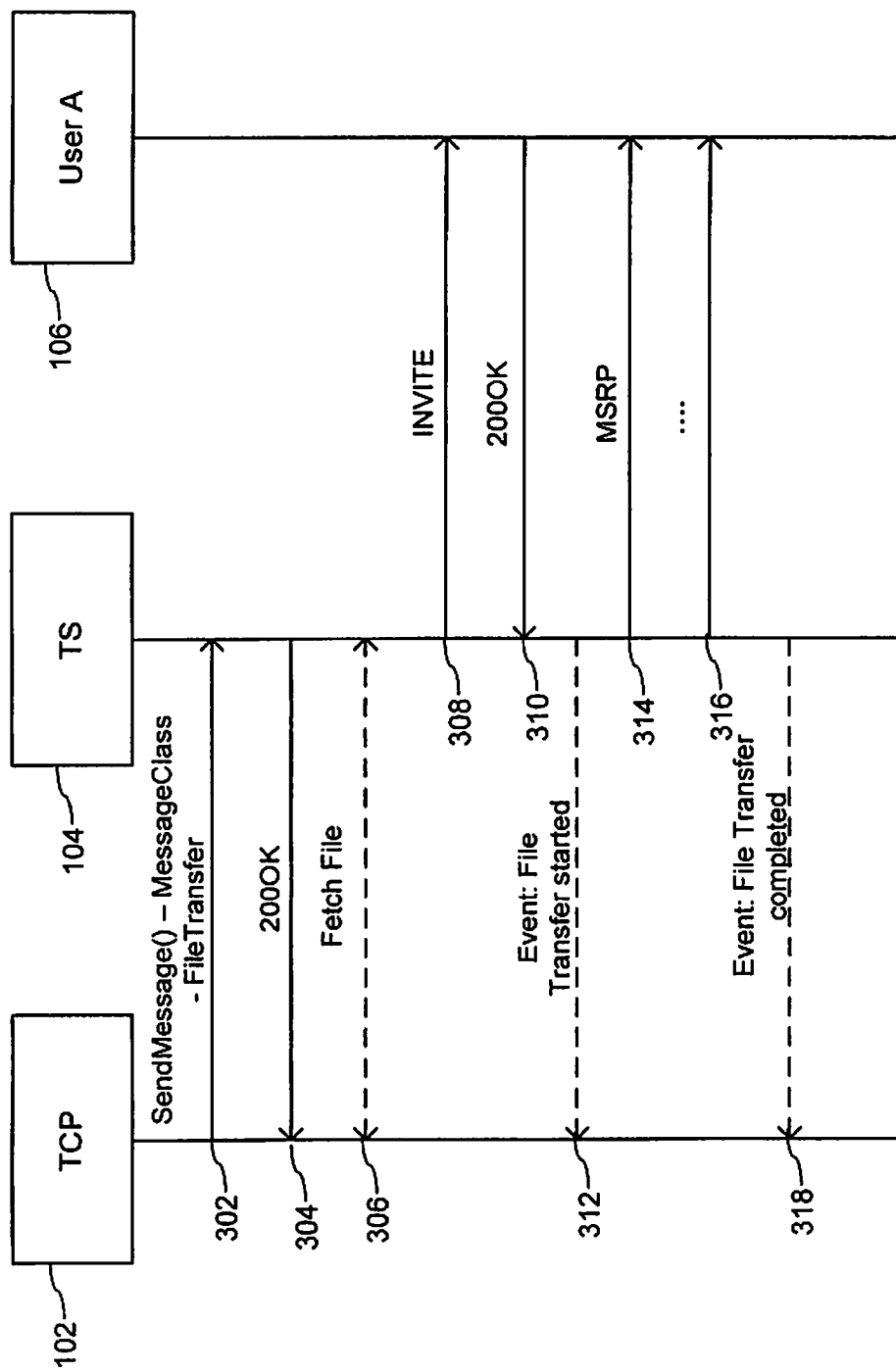
FIG. 3 is a flow diagram illustrating a method for transferring a file from a home network to a WAN user device, in accordance with another embodiment of the present invention.

FIG. 3 is a flow diagram illustrating a method for transferring a file from a home network to a WAN user device, in accordance with another embodiment of the present invention.

The file transfer is performed as a message type transfer, using a SendMessage( ) action. At step 302, the file transfer is performed using action SendMessage( ). The action defines a new Message class as FileTransfer. The TS 104 will receive a message and also retrieve a file and then establish a file transfer session with a WAN user and then send the file to the WAN user device 106.

At step 302, the TCP 102 sends a SendMessage( ) action and also includes the MessageClass as File Transfer in the action. The TS 104 then receives the sendMessage( ) request and checks the MessageClass as File Transfer. At step 304, a 200 OK response is sent by the TS 104 to the TCP 102. At step 306, the TS 104 fetches the file from the TCP 102. At step 308, the TS 104 initiates the file transfer session with the WAN user device 106 and sends an INVITE request to the WAN user device 106. At step 310, a 200 OK response is received from the WAN user device 106.

At step 312, the TS 104 sends an event to the TCP 102 as File Transfer started status when the session is established between the TS 104 and the WAN user device 106. From step 314 to step 316, the TS 104 transfers the file to the WAN user device 106 using MSRP protocol. At step 318, the TS 104 sends an event that the status of the file transfer is File Transfer complete when the file is transferred completely.

Figure 4:
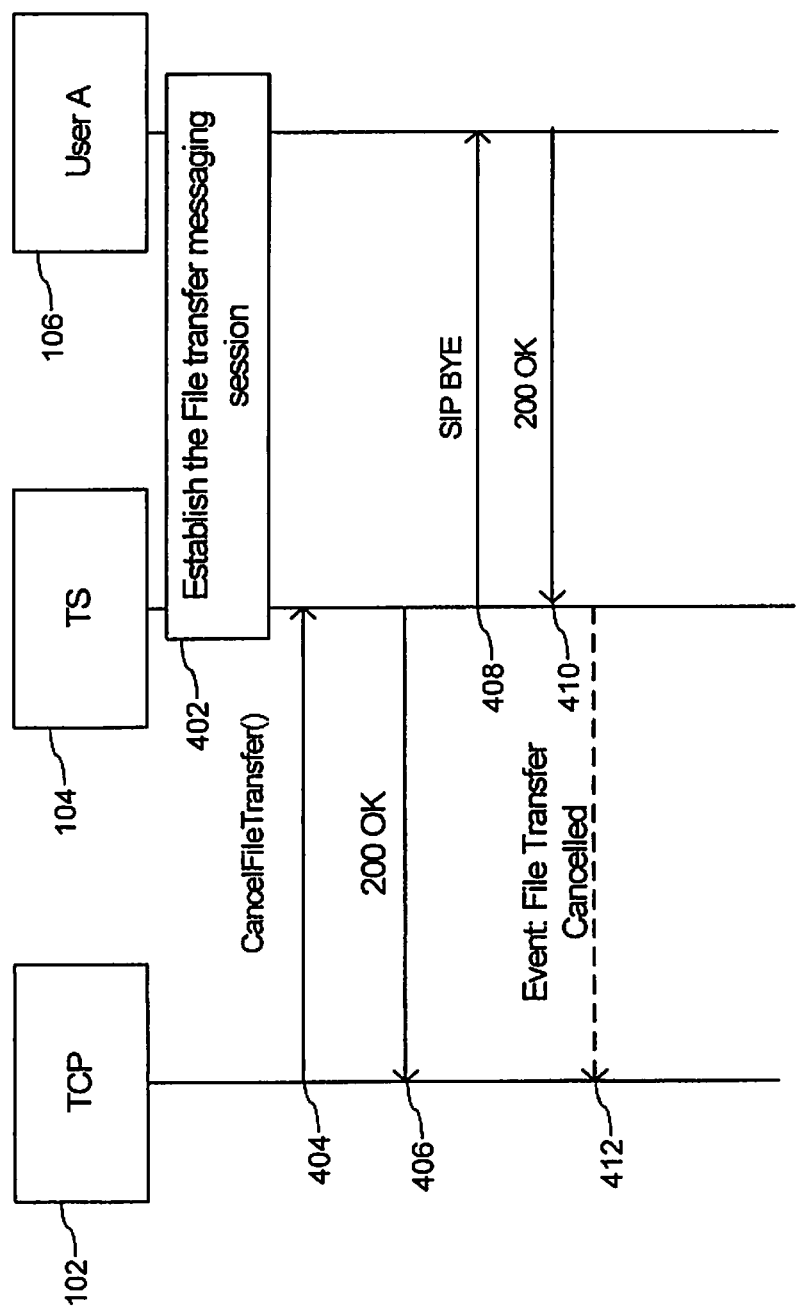
FIG. 4 is a flow diagram illustrating a method for canceling a file transfer session, in accordance with an embodiment of the present invention.

FIG. 4 is a flow diagram illustrating a method for canceling a file transfer session, in an embodiment of the present invention.

A method for canceling a file transfer session is depicted. For cancellation of the file transfer, a new action named CancelFileTransfer( ) having a session ID as an input argument is used. At step 402, it is shown that a file transfer messaging session is already established between the TS 104 and the WAN user device 106. At step 404, the TCP 102 sends a CancelFiletransfer( ) session to the TS 104. At step 406, the TS 104 sends a 200 OK response to the TCP 102. At step 408, the TS 104 sends a SIP BYE message to the WAN user device 106. At step 410, the WAN user device 106 sends a 200 OK response to the TS 104. At step 412, the TS 104 sends an event to the TC 104 stating that File Transfer Cancelled.

Figure 5:
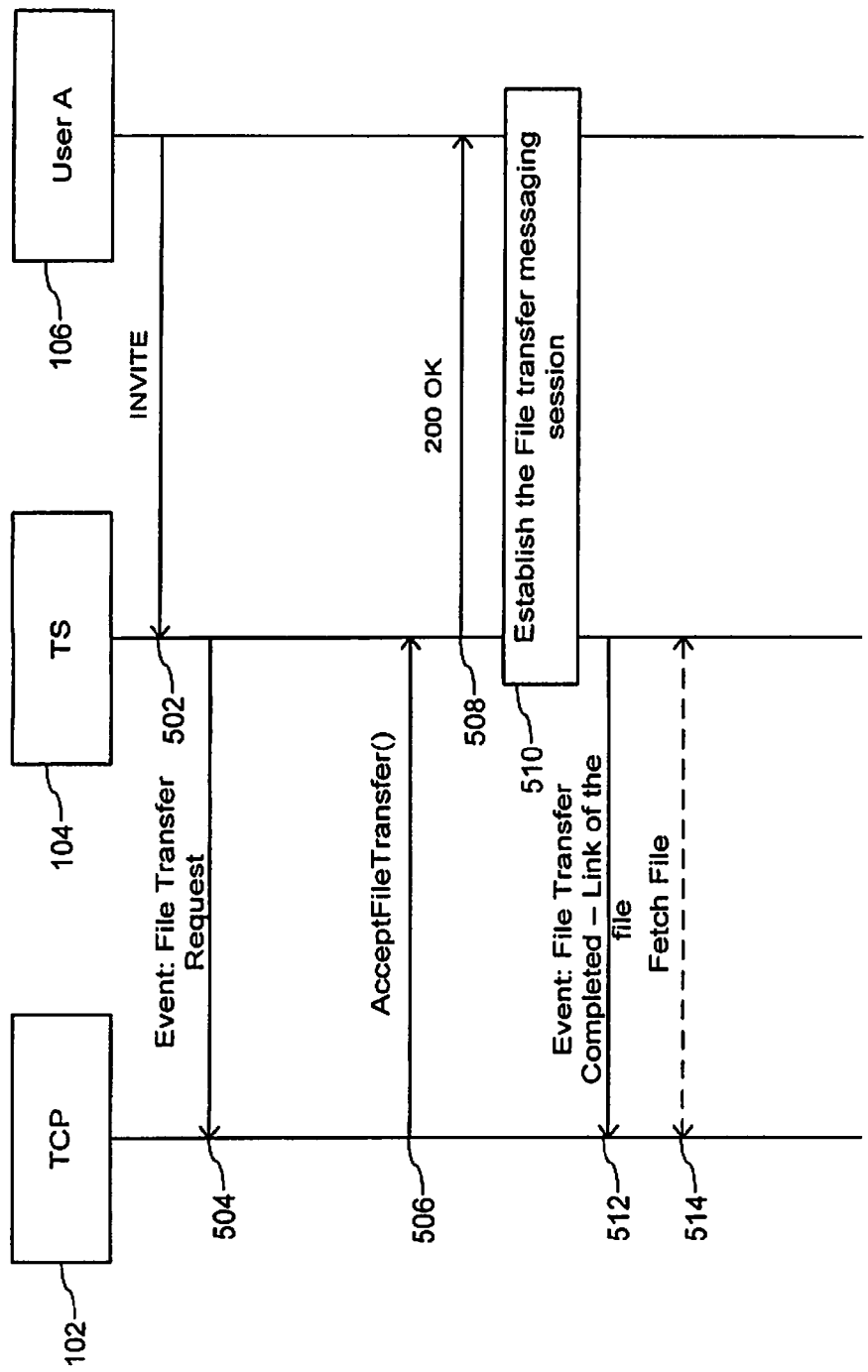
FIG. 5 is a flow diagram illustrating a method for handling incoming file transfer request from a user device, in accordance with an embodiment of the present invention.

FIG. 5 is a flow diagram illustrating a method for handling an incoming file transfer request from a user device, in accordance with an embodiment of the present invention.

At step 502, an INVITE is received at the TS 104 from the WAN user device 106. When a file transfer request is received, the TS 104 sends the request through a state variable change. At step 504, the TS 104 informs the TCP 102 about the file transfer request. In an embodiment of the present invention, step 504 is performed using existing state variable SessionUpdates or by defining the new state variable. The Session Status will contain a pending value, and a session class as described in the File-Transfer.

At step 506, the TCP 102 sends the new action AcceptFileTransfer( ) if the WAN user device 106 wants to accept the file transfer session. In an embodiment of the present invention, the existing action can be used to accept the session AcceptSession( ). The TS 104 then sends a positive response to the WAN user device 106 for the file transfer request. At step 508, a 200 OK response is sent to the WAN user device 106.

At step 510, the file transfer messaging session is established. Thereafter, the file is transferred. The information associated with the file is then sent to the TCP 102 by the TS 104. At step 512, the TS 104 send an event to the TCP 102 stating that File Transfer is complete. In an embodiment of the present invention, the link to the file is also sent to the TCP 102. In an embodiment of the present invention, the status can be sent using the state variable and may also include the link of the session once the file is completely transferred. In an embodiment of the present invention, the file is stored in the TS 104. At step 514, the file is fetched by the TCP 102 from the TS 104.

Figure 6:
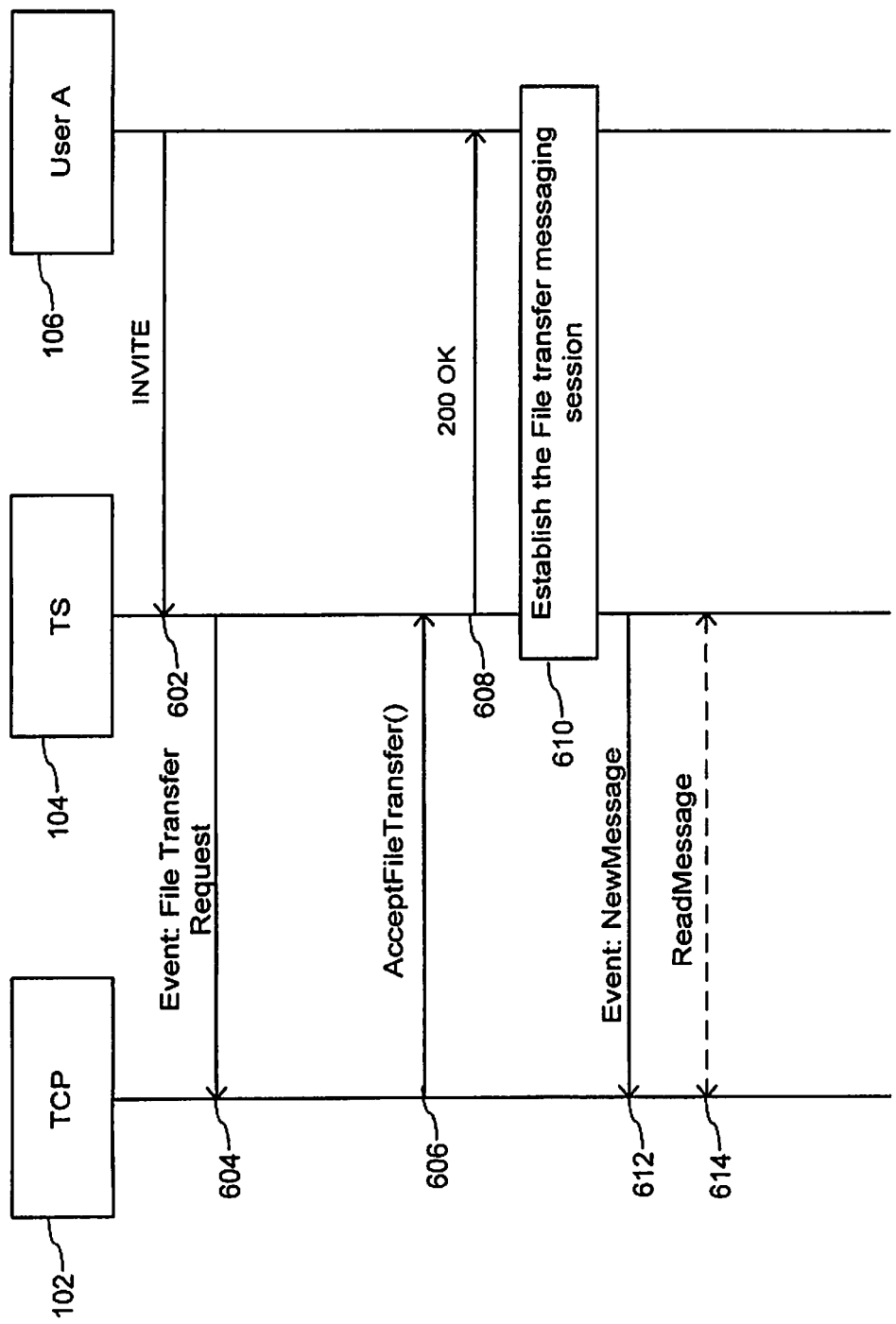
FIG. 6 is a flow diagram illustrating a method for handling a file transfer request, in accordance with an embodiment of the present invention.

FIG. 6 is a flow diagram illustrating a method for handling a file transfer request, in accordance with an embodiment of the present invention.

The incoming file can be stored as a new message, and the new message indication can be sent to the user. The user can then retrieve the message as a normal message. At step 602, an INVITE is received from the WAN user device 106 at the TS 104. When a file transfer request is received, the TS 104 sends the request through state variable change and informs the TCP 102 about the incoming file transfer request. At step 604, the TS 104 informs the TCP 102 about the file transfer request. In an embodiment of the present invention, step 604 is performed using existing state variable SessionUpdates or by defining the new state variable. The Session Status will contain a pending value, and a session class as mentioned in the File-Transfer.

At step 606, the TCP 102 sends the AcceptFileTransfer( ) action if the WAN user device 106 want to accept the file transfer session. In an embodiment of the present invention, the existing action can be used to accept the session AcceptSession( ). The TS 104 then sends a positive response to the WAN user device 106 for the file transfer request. At step 608, a 200 OK response is sent to the WAN user device 106.

At step 610, the file transfer messaging session is established. Thereafter, the file is transferred. The file in a message format is then sent to the TCP 102 by the TS 104. At step 612, the TS 104 send an event to the TCP 102 stating New Message. At step 614, the TCP 102 can read the message including file from the TS 104.

Figure 7:
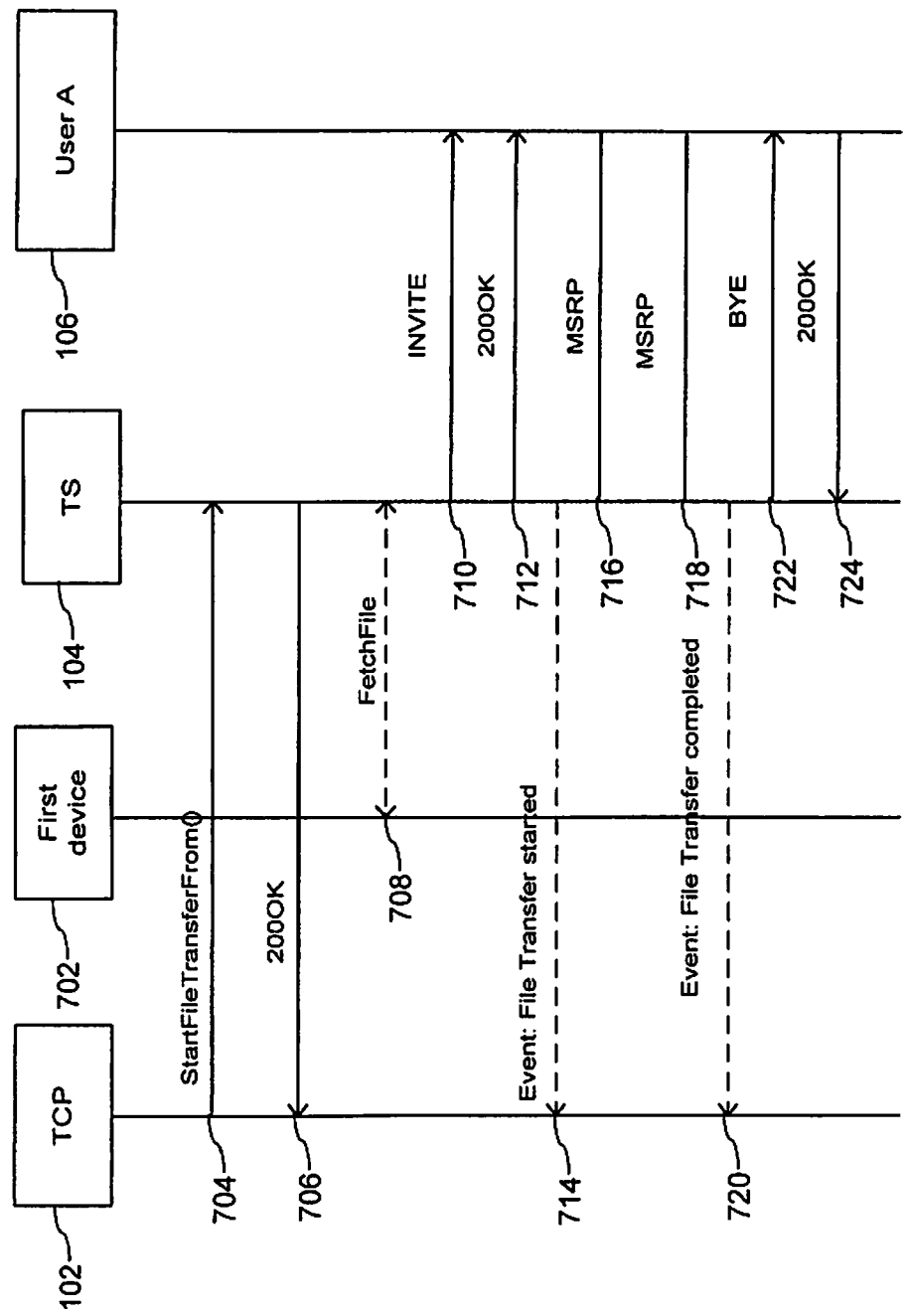
FIG. 7 is a flow diagram illustrating a method for transferring files from a second communication device, in accordance with an embodiment of the present invention.

FIG. 7 is a flow diagram illustrating a method for transferring files from a second communication device, in accordance with an embodiment of the present invention.

A method is depicted that allows the TCP 102 to transfer the file from any other server, for example a first device 702. An example of the first device 702 is a media server.

At step 704, an action is defined between the TCP 102 and the TS 104 so that TCP 102 can request a file transfer mechanism. The action can be initiated using a StartFileTransferFrom( ) function. At step 704, a start file transfer function is initiated and the function can have one argument called A_ARG_TYPE_FileInfoList, which will include details of the files and details of the server contact information for, for example, IP address and port information. In an embodiment of the present invention, the argument has an XML structure. The information may have a file link and file information, such as the type of file, file size, and the like. At step 706, the TS 104 fetches the action and responds with a 200 OK response to the TCP 102. At step 708, the TS 104 fetches the file from the first device 702 using the link provided in the action. The TS 104 retrieves the file from the first device 702 using contact information.

The TS 104 uses the available messaging technology to transfer the file to WAN user device 106, once the file is retrieved by the TS 104. The TS 104 then can use the same ongoing session if it is requested by the WAN user device 106. The argument can have a session ID. At step 710, the TS 104 sends a SIP INVITE request to the WAN user device 106 with the SDP that includes the file details, which enables the WAN user device 106 to identify the file transfer session. At step 712, a 200 OK response is received at the TS 104 from the WAN user device 106 and the session is established. At step 714, the TS 104 sends a message to the TCP 102 that the file transfer has started once the session is established.

In an embodiment of the present invention, the TCP 102 can request continuous progress of the file transfer. Hence, the TS 104 need sends a periodic notification about the progress of the file transfer. Thus, a notification type in the argument file info mentions periodic one element and then the TS 104 will send the notification to the TCP 102 periodically. The notification is sent as a state variable update to the TCP 102. This information can be included in the state variable already present in the messaging specification of the UPnP referred to as SessionUpdates. As an alternative, an embodiment of the present invention also proposes the new state variable for file transfer session as FileTransferSessioninfo From step 716 to step 718, the file is transferred to the WAN user device 106 using MSRP.

At step 720, the TS 104 sends an event stating file transfer complete to the TCP 102. Thereafter, at step 722, the TS 104 terminates the file transfer session by sending the SIP BYE request to the WAN user device 106. At step 724, a 200 OK response is received at the TS 104 from the WAN user device 106.

Figure 8:
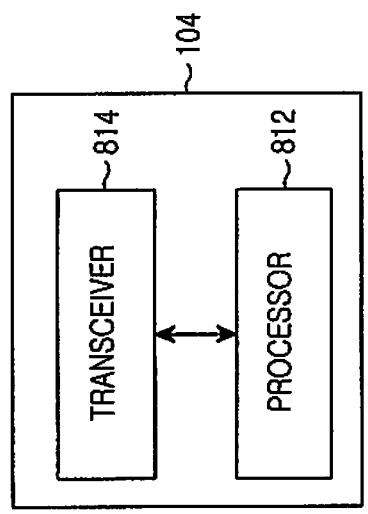
FIG. 8 illustrates a TS, in accordance with an embodiment of the present invention.

FIG. 8 illustrates a TS 104, in accordance with an embodiment of the present invention.

The TS 104 includes a transceiver 814 and a processor 812. In an embodiment of the present invention, The transceiver 814 receives a request from the TCP 102 to start a file transfer session, fetches a file from the TCP 102 when the request to start the file transfer session is received, sends an invite to the WAN user device 106 for initiating file transfer from a home network to the WAN user device 106, and transfers the file to the WAN user device 106 when an acknowledgment of the invite is received from the WAN user device 106.

The processor 812 establishes a file transfer session using a messaging service based on the request and file information received in the request from the TCP 102.

The transceiver 814 informs the TCP 102 when file transfer between the TS 104 and the WAN user device 106 is started or completed. The transceiver 814 receives a modify request from the TCP 102 to modify the file transfer session, fetches a modified file from the TCP 102, and sends a notification to the WAN user device 106 to fetch the modified file. When the transceiver 814 transfers the file to the WAN user device 106, the file is sent in a message format, or the file transfer session is initiated when an invite for initiation of a file transfer is received from the WAN user device 106.

Embodiments of the present invention provide a method and system for transferring a file from a home network to a WAN user device using the UPnP telephony service. The method allows a user to send a file to other network.

Embodiments of the present invention are related to the use of a computer system for implementing the techniques described herein. In one embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an embodiment that is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes a dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an embodiment of the present invention, the machine-readable medium can be a transmission media including coaxial cables, copper wire and fiber optics, including the wires that include a bus. Transmission media can also take the form of acoustic or light waves, such as those generated during radio wave and infrared data communications. Examples of machine-readable medium may include, but are not limited to, a carrier wave as or any other medium from which a computer can read, for example, online software, download links, installation links, and online links.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for transferring a file from a home network to Wide Area Network (WAN) user device using a Universal Plug and Play (UPnP) telephony service, the method performed at a Telephony Server (TS) comprising the steps of:
    receiving a request from a Telephony Control Point (TCP) to start a file transfer session, wherein the request comprises file information, and wherein the TCP and the TS are in the home network;
    establishing the file transfer session using a messaging service based on the request and the file information received in the request from the TCP;
    fetching the file from the TCP and storing the file in the TS;
    sending an invite to the WAN user device for initiating the file transfer session from the home network to the WAN user device; and
    transferring the file to the WAN user device when an acknowledgment of the invite is received from the WAN user device.

2. The method of claim 1, further comprising informing the TCP when the file transfer session between the TS and the WAN user device has started.

3. The method of claim 1, further comprising informing the TCP when the file transfer session between the TS and the WAN user device has been completed.

4. The method of claim 1 further comprising:
    receiving a modify request from the TCP to modify the file transfer session;
    fetching a modified file from the TCP; and
    sending a notification to the WAN user device to fetch the modified file.

5. The method of claim 1, wherein transferring the file to the WAN user device comprises sending the file in a message format.

6. The method of claim 1, wherein transferring the file to the WAN user device comprises initiating the file transfer session when an invite for initiation of a file transfer is received from the WAN user device.

7. A Telephony Server (TS) having memory, the telephony server comprising:
    a transceiver for:
    receiving a request from a Telephony Control Point (TCP) to start a file transfer session;
    fetching a file from the TCP when the request to start the file transfer session is received;
    sending an invite to a Wide Area Network (WAN) user device for initiating file transfer from a home network to the WAN user device; and
    transferring the file to the WAN user device when an acknowledgment of the invite is received from the WAN user device; and
    a processor for:
    establishing the file transfer session using a messaging service based on the request and file information received in the request from the TCP.

8. The telephony server of claim 7, wherein the transceiver informs the TCP when the file transfer session between the TS and the WAN user device has started.

9. The telephony server of claim 7, wherein the transceiver informs the TCP when the file transfer session between the TS and the WAN user device has been completed.

10. The telephony server of claim 7, wherein the transceiver receives a modify request from the TCP to modify the file transfer session, fetches a modified file from the TCP, and sends a notification to the WAN user device to fetch the modified file.

11. The telephony server of claim 7, wherein the transceiver transfers the file to the WAN user device by sending the file in a message format.

12. The telephony server of claim 7, wherein the transceiver transfers the file to the WAN user device by initiating the file transfer session when an invite for initiation of the file transfer is received from the WAN user device.

* * * * *